Patented Aug. 15, 1950

2,519,314

UNITED STATES PATENT OFFICE 2,519,314

ALKALINE AND ALKALINE EARTH SALTS OF INORGANIC ESTERS OF N-HETEROCYCLIC-1-PHENOL-4-SULFONAMIDES

Martin E. Hultquist, Bound Brook, and John S. Webb, Warren Township, Somerset County, N. J., assignors to American Cyanamid Company, New York, N. Y., a corporation of Maine No Drawing. Application April 16, 1949, Serial No. 88,026

9 Claims. (Cl. 260—256.5)

This invention relates to useful sulfonamides and more particularly to certain inorganic esters of N-(heterocyclic)-1-phenol-4-sulfonamides and the salts thereof, and a method of preparing same.

Certain N-(heterocyclic)-1-phenol-4-sulfonamides are active against some of the viruses and rickettsiae and may, therefore, become useful in the treatment of disease.

In acute infections, it becomes desirable to administer drugs in high concentrations and in a rapidly assimilable form so that the patient, as soon as possible, receives full therapeutic dosage. The above mentioned compounds are white powders of low solubility in water and in the body fluids, and consequently, can conveniently be taken in this form only by the oral route. Much time is lost until concentrations adequate to yield therapeutic effect are dissolved in the body fluids.

These compounds can be dissolved by the addition of alkalis but the resulting solutions, if concentrated enough for effective therapy, have a pH in the order of 10–12. Such strongly alkaline solutions are extremely irritating and may cause pain and discomfort when administered either orally or parenterally. The intradermal administration of such highly alkaline solutions is prone to cause pruritis and necrosis. In addition, the autoclaving of such alkaline solutions before parenteral use may cause some decomposition as evidenced by darkening of the solutions due to the high alkalinity.

One of the objects of this invention is to provide derivatives of N-(heterocyclic)-1-phenol-4-sulfonamides in a more highly useful form.

Another object is to provide soluble derivatives of N-(heterocyclic)-1-phenol-4-sulfonamides for parenteral administration.

A further object of our invention is to provide a method for the preparation of these soluble N-(heterocyclic)-1-phenol-4-sulfonamides.

Further objects and advantages of this invention will be apparent from the disclosure in the specification below and of some of the compounds, their properties and the methods for their manufacture.

We have found a new class of derivatives of N-(heterocyclic)-1-phenol-4-sulfonamides which are characterized by the following formula

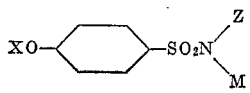

where X may be —$SO_3M$, —$PO_3M_2$ or —$PO_3HM$; M may be hydrogen, ammonium or a metal cation; and Z is a heterocyclic radical.

Among the useful heterocyclic radicals represented by Z, which may or may not bear substituent groups, are thiazolyl, pyrimidyl, pyridyl, pyrazyl, quinolyl, pyridazinyl, imidazolinyl, quinoxalyl, thiophenyl, triazolyl, pyrrolyl, pyrazolyl, thienyl, purinyl, thiadiazolyl, oxazolyl, thiazolidinyl, oxazinyl, acridinyl, pteridinyl and others. Substituents on the heterocyclic radical may be alkyl, aryl, alkoxy, hydroxyalkyl, carboxy, halo, carbalkoxy, nitro, amino, and similar radicals. The substituents may also be positioned to form part of a fused ring system.

The hydrogen atom of the ester radical as well as that attached to the amide nitrogen when M equals hydrogen, are acidic in nature and may be replaced with cationic salt forming radicals. For general parenteral use, sodium, potassium, ½ magnesium, ½ calcium, ammonium and lithium ions are preferred inasmuch as these salts are the most soluble and least toxic for such use. However, salts of other metal ions may also be used when their solubility is adapted to the particular mode of administration such as for external use. The particular slowly solubilizing properties which are inherent in some of the other metal salts are useful for implantation in order that the proper therapeutic blood level may be maintained over a period of time.

We have found that certain salts of these compounds are very soluble in water and that 25–35% solutions by weight can readily be obtained at room temperature. The sodium salts are particularly suitable. These solutions can be adjusted to pH 4.5–8.5. For parenteral use, particularly intravenous use, it is advisable to adjust the solution to pH 6.5–7.5. These solutions may be autoclaved or boiled either before or after the adjustment of the pH without measurable decomposition or darkening.

The sulfuric esters we have found to be unstable in strongly acid solutions, i. e., 1N $H_2SO_4$, and tend to decompose to give the N-(heterocyclic)-1-phenol-4-sulfonamides. The phosphoric esters, on the other hand, while not quite as soluble, are much more stable in acid solution. The salts of both the sulfuric and phosphoric esters, however, are reasonably stable at pH 4–6, and completely stable at higher pH ranges. We have prepared the salts of the esters of N-(heterocyclic)-1-phenol-4-sulfonamide in the form of mono and disodium salts in the case of the sulfuric and phosphoric esters. The pH of the unadjusted solutions of these compounds increases with the increment of anion substitution of the compound.

The compounds of the present invention may be prepared by the reaction of N-(heterocyclic)-1-phenol-4-sulfonamides with the addition products of a tertiary base and appropriate sulfating and phosphating agents. Since the adducts of sulfur trioxide and chlorosulfonic acid with tertiary organic bases differ in their stability to hydrolysis with water, different reaction conditions are possible for preparation of the sulfuric esters of the present invention. For example, when using the triethylamine-$SO_3$ and N-ethylmorpholine-$SO_3$ adducts, the reaction may be carried out in aqueous alkaline solutions or under anhydrous conditions in an organic solvent or in an excess of the tertiary organic base. When using the pyridine-$SO_3$ adduct, the reactions must be carried out under anhydrous conditions in an organic solvent such, for example, as ethylene dichloride or monochlorobenzene. For the preparation of the phosphoric acid esters, a tertiary organic base is necessary as solvent for proper reaction. After removal of the tertiary base, the product is readily isolated as the salt by adjusting the pH in the presence of the appropriate metal ions.

The tertiary bases which we prefer to use are triethylamine or pyridine. However, other tertiary amines which are suitable include quinoline, the lutidines, the collidines, trimethylamine, dimethylaniline, cyclohexyldimethylamine, methylmorpholine, ethylmorpholine and others.

When the reaction is carried out in aqueous solutions we prepare the salts of the esters directly by running the reaction in a solution which is rendered alkaline by the use of a base consisting of the hydroxides, oxides or carbonates of the respective cation from which the salt is to be made. As pointed out above, the more soluble salts are the salts of sodium, potassium, magnesium, ammonium and lithium. In the case of sodium and potassium either the carbonates or hydroxides may be used. In the case of magnesium, ammonium, and lithium the hydroxides are the preferred reagents.

The esterifying agents found most effective are sulfur trioxide and phosphorous oxychloride. However, among the other reagents which will achieve the same result are chlorosulfonic acid and phosphorous pentoxide.

N-(heterocyclic)-1-phenol-4-sulfonamides which form metal salt inorganic esters include those, for example, in which the heterocyclic substituent is: 2-thiazolyl, 5-carboxy-2-thiazolyl, 2-benzothiazolyl, 4,5-dimethyl-2-thiazolyl, 5-carbethoxy-2-thiazolyl, 4-phenyl-2-thiazolyl, 4-methyl-2-thiazolyl, 2-pyrimidyl, 5-chloro-2-pyrimidyl, 4-methoxy-2-pyrimidyl, 4-methyl-2-pyrimidyl, 4,6-dimethyl-2-pyrimidyl, 4,6-dimethoxy-2-pyrimidyl, 2-pyridyl, 2-quinolyl, 5-chloro-2-pyridyl, 5-methyl-2-pyridyl, 3-methyl-2-pyridyl, 6-methyl-2-pyridyl, 4-methyl-2-pyridyl, 5-methyl-1,3,4-thiadiazol-2-yl, 1,3,4-thiadiazol-2-yl, 5-phenyl-1,3,4-thiadiazol-2-yl, 5-amino-1,3,4-thiadiazol-2-yl, 2-pyrazinyl, 2-quinoxalyl, 5,6-dimethyl-2-pyrazinyl, 3,5-dimethyl-2-pyrazinyl, 5-methyl-4-thiazolon-2-yl, 2-benzimidazolyl, 2-thiazolinyl, 6-methyl-3-pyridazinyl, 3-phenyl-5-isoxazolyl, 1,2,4-triazol-2-yl, 2-thienyl, etc.

The invention will now be illustrated by detailed descriptions of the mode of preparation of several of these new salts of inorganic esters of N-(heterocyclic)-1-phenol-4-sulfonamides. It is understood that the invention is not limited to the compounds of the examples but includes the broad class of sulfuric and phosphoric acid esters of N-(heterocyclic)-1-phenol-4-sulfonamides and their salts formed with cations.

Example 1

In a suitable vessel equipped with a stirrer and heated on a water bath are placed 26 parts of N-(2-thiazolyl)-1-phenol-4-sulfonamide, 37 parts of 98% triethylamine-sulfur trioxide, 32 parts of sodium carbonate and 200 parts of water. This mixture is heated to 50°±5° C. and stirred at this temperature for 2 hours. To the resulting reaction mixture is added 42 parts of a 50% solution of sodium hydroxide and the whole is then boiled until essentially all the triethylamine has been driven off. While still hot, the solution is treated with 2 parts of decolorizing carbon and clarified. The resulting light-brown solution is cooled to about 10° C. seeded with a crystal of sodium sulfate decahydrate and placed in an ice box until crystallization of the inorganic salt is complete. The solid is filtered off and the filtrate is saturated with sodium chloride. Upon cooling again a hydrate of the product separates in the form of almost colorless, fine needles which are filtered off, washed with alcohol and dried at 50° C. The material thus obtained is a hydrate which melts with loss of water around 100–120° C. Purification of this crude product can be effected by recrystallization from an equal volume of water or from 95% alcohol. A water-free product can be obtained by drying at elevated temperatures. Disodium N-(2-thiazolyl)-1-phenol-4-sulfonamide sulfate when pure and dry is a white powder which melts with decomposition in the range of 275–278° C. It is soluble in 2 to 3 parts of water at room temperature giving a water-white solution which has a pH of about 9.5. Such solutions are stable to boiling, but hydrolyze to N-(2-thiazolyl)-1-phenol-4-sulfonamide when strongly acidified.

Example 2

Nineteen parts of the disodium N-(2-thiazolyl)-1-phenol-4-sulfonamide sulfate are dissolved in 50 parts of water. A solution of 5N sulfuric acid is added until the pH of the solution is about 7.0. The solution is heated and partially evaporated in a stream of air until crystals begin to separate and then it is cooled in an ice-bath. The resulting mass of crystals is filtered off, dried, and purified by crystallization from 90% alcohol. The hydrated monosodium salt thus obtained is soluable in about 4 parts of water at room temperature giving a solution with a pH of about 4.8. This salt does not have a definite melting point, but decomposes in the range of 200–250° C.

Example 3

By substituting potassium compounds for the corresponding sodium compounds in Example 1, the di-potassium salt of N-(2-thiazolyl)-1-phenol-4-sulfonamide sulfate can be obtained. This compound is similar in properties to the disodium salt, but does not have a definite melting or decomposition point. It darkens and chars slowly in the range 200–250° C.

Example 4

In a flask equipped with a stirrer and heated on a steam bath are placed 26 parts of N-(2-thiazolyl)-1-phenol-4-sulfonamide, 37 parts of triethylamine-sulfur trioxide, 12 parts of magnesium oxide and 200 parts of water. The mixture is stirred and heated at 80–90° C. for 7 hours. A slurry of 10 parts of magnesium oxide in 50 parts of water is added and the whole boiled until essentially all of the triethylamine liberated during the reaction has been driven off. The solids present are filtered off and the filtrate evaporated on a steam bath until crystals begin to form. After cooling, the precipitate, which is largely inorganic, is filtered off and the filtrate evaporated to a syrup. On standing, this crystallizes to a solid mass which is ground and refluxed with 100 parts of alcohol. After filtering off the insoluble material, the alcohol is evaporated, leaving the crude product in the form of a syrup which solidifies on standing. Crude magnesium N-(2-thiazolyl)-1-phenol-4-sulfonamide sulfate is purified by first recrystallizing it from a concentrated solution of magnesium chloride, and then from n-butyl alcohol, from which it is obtained as a fine, white powder.

*Example 5*

By a procedure similar to the Example 1 for N-(2-thiazolyl)-1-phenol-4-sulfonamide, it is possible to prepare disodium N-(4,6-dimethyl-2-pyrimidyl)-1-phenol-4-sulfonamide sulfate using as starting material N-(4,6-dimethyl-2-pyrimidyl)-1-phenol-4-sulfonamide. The resultant purified product has a melting point range 315–318° C. with decomposition.

*Example 6*

By a procedure similar to the Example 1 for N-(2-thiazolyl)-1-phenol-4-sulfonamide, it is possible to prepare disodium N-(5-methyl-1,3,4-thiadiazol-2-yl)-1-phenol-4-sulfonamide sulfate using as starting material N-(5-methyl-1,3,4-thiadiazol-2-yl)-1-phenol-4-sulfonamide. The resultant purified product has a melting point range 280–290° C. with decomposition.

*Example 7*

By a procedure similar to the Example 1 for N-(2-thiazolyl)-1-phenol-4-sulfonamide, it is possible to prepare disodium N-(2-pyrimidyl)-1-phenol-4-sulfonamide sulfate using as starting material N-(2-pyrimidyl)-1-phenol-4-sulfonamide. The resultant purified product has a melting point range 260–265° C. with decomposition.

*Example 8*

By a procedure similar to the Example 1 for N-(2-thiazolyl)-1-phenol-4-sulfonamide, it is possible to prepare disodium N-(4,5-dimethyl-2-thiazolyl)-1-phenol-4-sulfonamide sulfate. The resultant purified product has a melting point range 295–300° C. with decomposition.

*Example 9*

By a procedure similar to the Example 1 for N-(2-thiazolyl)-1-phenol-4-sulfonamide, it is possible to prepare disodium N-(5-chloro-2-pyrimidyl)-1-phenol-4-sulfonamide sulfate using as starting material N-(5-chloro-2-pyrimidyl)-1-phenol-4-sulfonamide. The resultant purified product has a melting point range 332–335° C. with decomposition.

*Example 10*

N-(2-thiazolyl)-1-phenol-4-sulfonamide, 26 parts, is dissolved in 75 parts of dry pyridine and the solution cooled to 10° C. To the resulting thick slurry is added 75 parts of dry chloroform. Then, during constant stirring and with the temperature maintained at 10±3° C., a solution of 17 parts of phosphorous oxychloride in 38 parts of dry chloroform is added dropwise over a period of 30 minutes. The reaction mixture is allowed to warm up to room temperature. Cold water, 100 parts, is added to the mixture and the whole stirred until all of the solids dissolve. The chloroform layer is discarded and the aqueous layer is just neutralized by the addition of 42 parts of a 50% sodium hydroxide solution. This neutral solution is evaporated until crystals appear, and then cooled in an ice bath to complete crystallization. The almost white sodium salt of the phosphoric ester thus obtained is filtered off and dried.

We claim:

1. Esters of the group consisting of those having the general formula

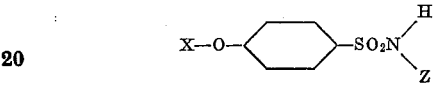

wherein X is a member of the group of inorganic ester forming radicals consisting of —SO$_3$H and —PO$_3$H$_2$, Z is a heterocyclic radical, and salts thereof.

2. Esters of the group consisting of those having the formula

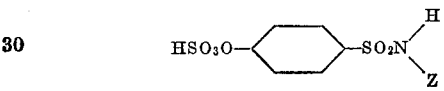

where Z is a heterocyclic radical and the salts thereof.

3. Esters of the group consisting of those having the formula

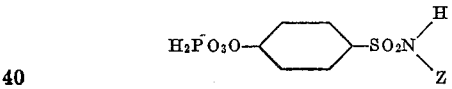

where Z is a heterocyclic radical and the salts thereof.

4. Disodium N-(2-thiazolyl)-1-phenol-4-sulfonamide sulfate.

5. Monosodium N-(2-thiazolyl)-1-phenol-4-sulfonamide sulfate.

6. Disodium N-(4,6-dimethyl-2-pyrimidyl)-1-phenol-4-sulfonamide sulfate.

7. The method for the preparation of compounds having the formula

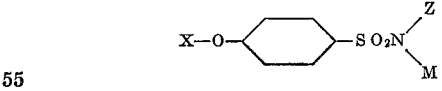

where X is an inorganic ester radical of the group consisting of —SO$_3$M, —PO$_3$M$_2$, and —PO$_3$HM, Z is a heterocyclic radical and M is a cation; which comprises reacting compounds of the formula

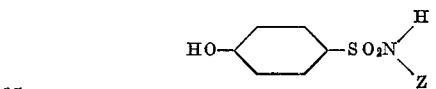

with a compound chosen from the group of sulfating and phosphating compounds consisting of the adducts of sulfur trioxide, phosphorous oxychloride, chlorsulfonic acid, and phosphorous pentoxide with a tertiary organic base in an anhydrous organic solvent, rendering the reaction products alkaline with an inorganic base chosen from the class of hydroxides, carbonates and oxides of the cation M and separating out the said product.

8. The method for the preparation of compounds having the formula

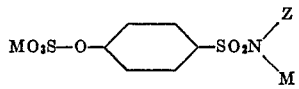

where Z is a heterocyclic radical, and M is a cation chosen from the class consisting of sodium, potassium, lithium, ammonium, calcium, magnesium, which comprises reacting compounds of the formula

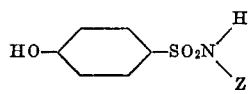

with an adduct of sulfur trioxide with a tertiary organic base in the presence of an inorganic base chosen from the class of hydroxides, carbonates and oxides of the cations mentioned above and separating out the said product.

9. The process of preparing monosodium salts of esters having the formula

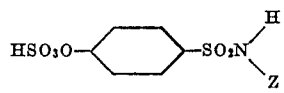

in which Z is a heterocyclic radical which comprises neutralizing solutions of disodium salts of the esters with acid, evaporating the resulting solution until crystallization of the monosodium salt takes place and purifying and dehydrating the said product.

MARTIN E. HULTQUIST.
JOHN S. WEBB.

No references cited.